United States Patent [19]
Walker et al.

[11] Patent Number: 5,737,414
[45] Date of Patent: Apr. 7, 1998

[54] 900 NUMBER BILLING AND COLLECTION SYSTEM AND METHOD FOR ON-LINE COMPUTER SERVICES

[75] Inventors: Jay Walker, Ridgefield, Conn.; Bruce Schneier, Oak Park, Ill.

[73] Assignee: Walker Asset Management Limited Partnership, Stamford, Conn.

[21] Appl. No.: 859,162

[22] Filed: May 20, 1997

Related U.S. Application Data

[63] Continuation of Ser. No. 449,208, May 24, 1995, abandoned.
[51] Int. Cl.$^6$ .......................................................... H04L 9/32
[52] U.S. Cl. .................................................. 380/4; 380/2.5
[58] Field of Search ............................................. 380/4, 25

[56] References Cited

U.S. PATENT DOCUMENTS

| | | |
|---|---|---|
| 3,704,346 | 11/1972 | Smith et al. |
| 4,192,972 | 3/1980 | Bertoglio et al. |
| 4,626,630 | 12/1986 | Waldman |
| 4,757,267 | 7/1988 | Riskin |
| 4,827,508 | 5/1989 | Shear .................... 380/4 |
| 4,987,587 | 1/1991 | Jolissaint |
| 5,146,491 | 9/1992 | Silver et al. |
| 5,148,474 | 9/1992 | Haralambopoulos et al. |
| 5,187,710 | 2/1993 | Chau et al. |
| 5,311,572 | 5/1994 | Friedes et al. |
| 5,345,501 | 9/1994 | Shelton |
| 5,369,699 | 11/1994 | Page et al. |
| 5,418,844 | 5/1995 | Morrisey et al. ........ 379/207 |
| 5,509,070 | 4/1996 | Schull .................... 380/4 |
| 5,592,511 | 1/1997 | Schoen et al. .......... 375/220 |

OTHER PUBLICATIONS

800/900 Billing Systens, www.galaxy-net.com undated.
Business Wire p7121251, "Interactive Services Association Announces Winners of 11th Annual Awards Competition", 12 Jul. 1995.

Telemedia News and Views, "The 900 Industry: Takin' Care of Business in '94, Jan. 1994.

Newsbytes, NEW06200021, DanaBlankenhorn, "Virtual Mall Opens in Cyberspace," 20 Jun. 1994.

Newbytes News Network, 05348022, "First Virtual Bank of Cyberspace," 28 Oct. 1994.

Newbytes News Network, 01064674, "First Virtual Offers Internet Merchant Banking," 27 Oct. 1994.

*Boardwatch Magazine*, Apr. 1996, p. 29.

*Web Week*, vol. Two, Issue Five, Apr. 29, 1996, p. 82.

Six pages describing the Logicom Billing System from its web site http://www.logicom.com., Copyright notice of 1996.

*Primary Examiner*—Gilberto Barrón, Jr.
*Attorney, Agent, or Firm*—Morgan & Finnegan LLP; Jeffrey L. Brandt

[57] ABSTRACT

A billing and collection system for enabling payment for a service provided over a data network by billing a customer for a telephone connection to a shared revenue billing network where the telephone connection to the billing network regulates access to the service provided over the data network, comprising: a data network including at least one user on-line service provider presenting at least one service for on-line access by a user with a user computer through the data network, a billing network and an access management computer for controlling access to the on-line service provider and billing the user for access to the on-line service provider, the access management computer communicating with the data network for enabling and terminating access to the on-line service provider through the user computer whereby the billing network shares revenues for the telephone connection with the on-line service provider.

19 Claims, 9 Drawing Sheets

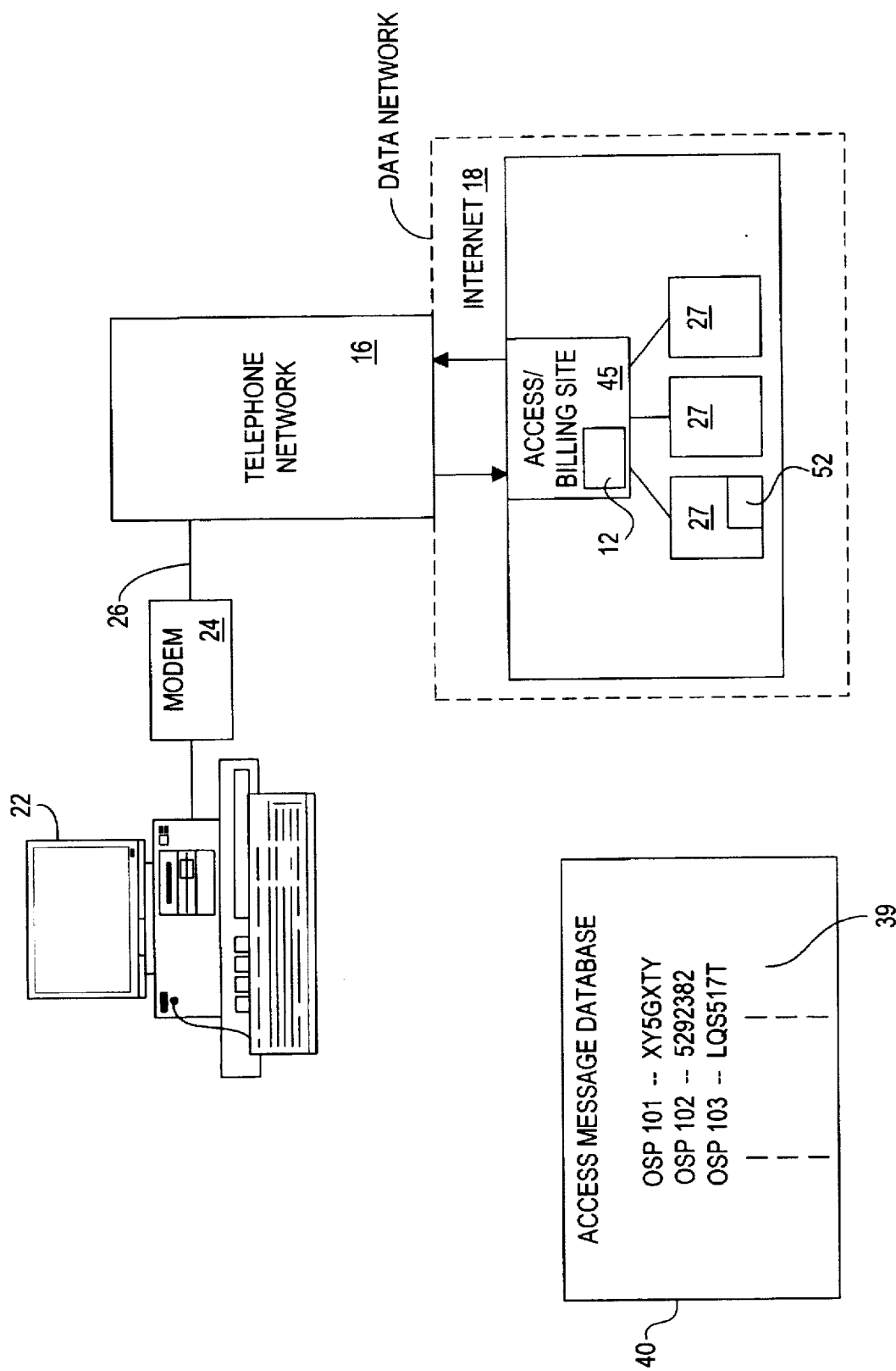

900 NUMBER BILLING AND COLLECTION SYSTEM AND METHOD FOR ON-LINE COMPUTER SERVICES

This is a continuation of application Ser. No. 08/449,208, filed on May 24, 1995 now abandoned.

BACKGROUND

The present invention relates generally to billing for on-line services made available to a user on a computer or data network, and more particularly, to a billing and collection system and method in which access to such services on the computer or data network and billing therefor is linked to a telephone connection associated with a billing network that manages and bills for access to information over the data network.

One of the key problems with on-line services (the "Internet") as it relates to commerce is the difficulty of Internet information service providers ("on-line service providers") to charge users per-minute, incremental or flat fees for usage. One way these fees are charged for access to various on-line service providers is by simply billing the user's on-line service account when such an account exists.

Another way by which information providers can collect payment is by having the user establish an account with the on-line service providers on a billing or credit card charge basis. This approach can be cumbersome, time consuming and risky from a security standpoint. Moreover, for on-line service provider access where relatively low costs are incurred, the collateral costs associated with small incremental billing make this approach uneconomical. Unfortunately, transferring credit card numbers via the Internet carries the risk of theft from unscrupulous computer hackers and thieves, and digital money or encryption metering concepts are still a long way from practical implementation.

Although encryption systems will eventually facilitate the common use of credit card numbers for transmission through cyberspace for decryption at the on-line service provider, some users will never feel completely comfortable providing their credit card numbers in this manner, even if the communications are ostensibly made secure. Moreover, some users may not be able to obtain a credit card or have one available with a sufficient amount of credit. Furthermore, credit card companies may assess or require a minimum charge in order to process the billing.

In summary, there exists a problem that casual short-term or single usage visits to a on-line service provider on a computer network cannot be charged for access on a per-minute or fractional basis in an economical manner for both the on-line service provider and the user.

SUMMARY OF THE INVENTION

In one embodiment of the present invention, the method utilizes an access management computer to control a user's access to digital data located at a remote data site and causes a billing system separate from the remote data site to toll the user's access to the digital data. The access management computer receives, from the billing system, the user's request for access to the remote data site, connects to the remote data site, and sends an access message to the data site to allow the user access to the digital data. The billing system posts an access charge to an account associated with the user based on a transmission of the digital data to the user.

The present invention provides for billing and collection in a computer system, where, in one embodiment, the system comprises a data network including at least one on-line service provider for on-line access by a user over a first telephone line with a user computer through the data network, a billing network including a second telephone line at the user's residence or business from which access is desired, and an access management computer.

The access management computer enables a user to obtain access to the on-line service provider by communicating a unique access message to the user and the on-line service provider. The access management computer may be associated with the billing network, an independent service bureau which handles shared billing between the billing network and the data network, or it may be directly associated with the on-line service provider. The access management computer includes or is associated with a database, in which are stored access messages for the various on-line service providers. Alternatively, the access management computer may generate a particular access message. The access message may be valid for a single on-line service provider or a plurality of on-line service providers, and for a single session or for a plurality of sessions.

In one embodiment of the invention, when a user reaches the "home page" of a on-line service provider, it displays a telephone number for the user to call to obtain the access message. The home page may also display a message that the cost for using this on-line service provider is xx¢ per minute or xx¢ per minute after the first x minutes or the like, or some fixed charge. In an alternative embodiment, the instructions for the user and related phone information reside in a directory, either stored in memory on the user computer or in some external medium.

When the user desires access to a on-line service provider, he or she dials the 900# which routes the call through the billing network to the access management computer. The access management computer provides the access message to the user over the voice network and at the same time provides the on-line service provider with instructions to allow the user who enters that access message into the user computer to gain access to the on-line service provider for as long as the second telephone line is left open, or for some predetermined amount of time after the 900 call is terminated. When the user enters the access message into the user computer, the on-line service provider reads the access message and if the access message entered by the user matches the access message provided by the access management computer, the user is given access to the on-line service provider. When the user desires to leave the on-line service provider, the user simply terminates the connection on the second telephone line. This signals the access management computer to terminate access to the on-line service provider for the particular access message associated with this session. This arrangement separates the channels of communication between the voice network and the data network. The user is simply billed for access to the on-line service provider by the telephone company (or billing collection agent) associated with the billing network for the toll fee calls in the usual course of telephone charges for telephone calls made on the second telephone line. The revenues based on the toll fee are shared between the telephone company (or billing collection agent) and the service provider, and any service bureau or agent thereof. The billing and collection agent may be an on-line service such as America On-Line, Prodigy and the like. Thus, the on-line service becomes a billing and collection agent for the on-line service provider and the telephone company.

In yet another embodiment of the invention, the system utilizes the 900# billing network as a on-line service provider gateway. The system operates similarly to the embodiment described above, but does not require that the communications be separated between the data network and the voice network. The user computer can access the voice network and data network directly through a single telephone connection. In this connection, the user computer operates in the same manner to provide access to a particular on-line service provider by enabling the same with an access message. The billing network provides for billing the user for as long as the access computer keeps the on-line service provider open for that access message, or for some predetermined amount of time. The user may then be billed a single aggregate charge for the on-line service provider or on-line service providers accessed. In an alternative single communication channel embodiment, the access message may be authenticatable whereby it is generated by the user computer using known encryption protocols and is communicated to the on-line service provider through the data network whereupon it is read and authenticated (decrypted) by the on-line service provider for access. In this regard, the authenticatable access message may contain user specified limitations as to desired access time and maximum cost to be incurred for any session.

In another embodiment of the invention, credit is obtained from the billing network and charged to the user through the phone company as described above with respect to the other embodiments. This credit is downloaded to the user computer and communicated to the on-line service provider over the data network. The system operates in the following manner. First, the user computer dials the 900# and connects to the access management computer. This may be done either on a single telephone line which serves to connect to both the billing network and the data network, or through a second telephone line which independently communicates the user computer with the billing network for the sole purpose of obtaining credit. The user is prompted through appropriate software to enter the amount of credit requested for on-line service provider access. The user enters the amount into the user computer, and the access management computer generates an authenticatable value token message which is based upon the amount of credit requested, an identification message of the particular on-line service requested, and possibly the 900# or the user's own telephone number or some other personal identification code. The value token message is transmitted to the user computer and stored in memory. The user then connects to the on-line service provider which has its own computer which reads and authenticates the value token message. The authentication may take the form of encryption and decryption. The user is then provided access to the on-line service provider to the extent of available credit embodied in the value token message. The value token message may be obtained in fractional amounts if desired. In this regard, the value token message may represent a series of fractional amounts of credit (e.g., pennies, dimes or quarters) which are used by the on-line service provider to gain access for corresponding limited amounts of time. Thus, the on-line service provider would intermittently read and authenticate the value token message and allow the user continued access to the extent of any remaining credit. When all credit is exhausted, access for the user is terminated until the user goes back to the billing network and repeats the procedure. The user is billed and revenues are shared with the on-line service provider as described above with respect to the other embodiments.

Alternatively, the billing provider may be disposed on the Internet itself in the form of a dedicated billing site. The billing site serves as a gateway to all of the networked on-line service providers and regulates all billing for and access thereto. The billing site has an access management computer associated therewith which facilitates access to the on-line service providers and communicates with a billing system. The billing system bills access charges to the user's on-line service account. When a user desires to obtain access to an on-line service provider, he or she is prompted by the billing site to enter a message ID associated with the user's on-line billing account. The billing site then provides an anonymous access message to the particular on-line service provider to which access is requested. The on-line service provider may have its own computer which records the amount of time access is made available for any given session. Similarly, the access management computer at the billing site may do the same to serve as a redundant audit trail. The access management computer continuously monitors the connection. When the user desires to terminate access to the on-line service provider, the access management computer sends a termination message to the on-line service provider to terminate user access. The process may be repeated if the user desires access to another on-line service provider. The billing site accumulates bills for all on-line service provider sessions, and then bills the user through the billing system in a conventional manner. Since the charges for various on-line service providers may vary, the billing site can bill the user a single aggregate charge for all on-line service providers accessed during any given period of time, even if the individual charges differ among all of the on-line service providers.

In any of the above-described embodiments, the on-line service provider may download software in lieu of information to the user computer.

BRIEF DESCRIPTION OF THE DRAWINGS

FIG. 3 is a schematic of the access message database;

FIG. 7 is a schematic of the billing and collection system in a fourth principal embodiment of the invention.

DETAILED DESCRIPTION OF THE PREFERRED EMBODIMENTS

With reference to the several views of the drawings, there are depicted several embodiments of a parallel billing and collection system in accordance with the present invention.

Figure 1:
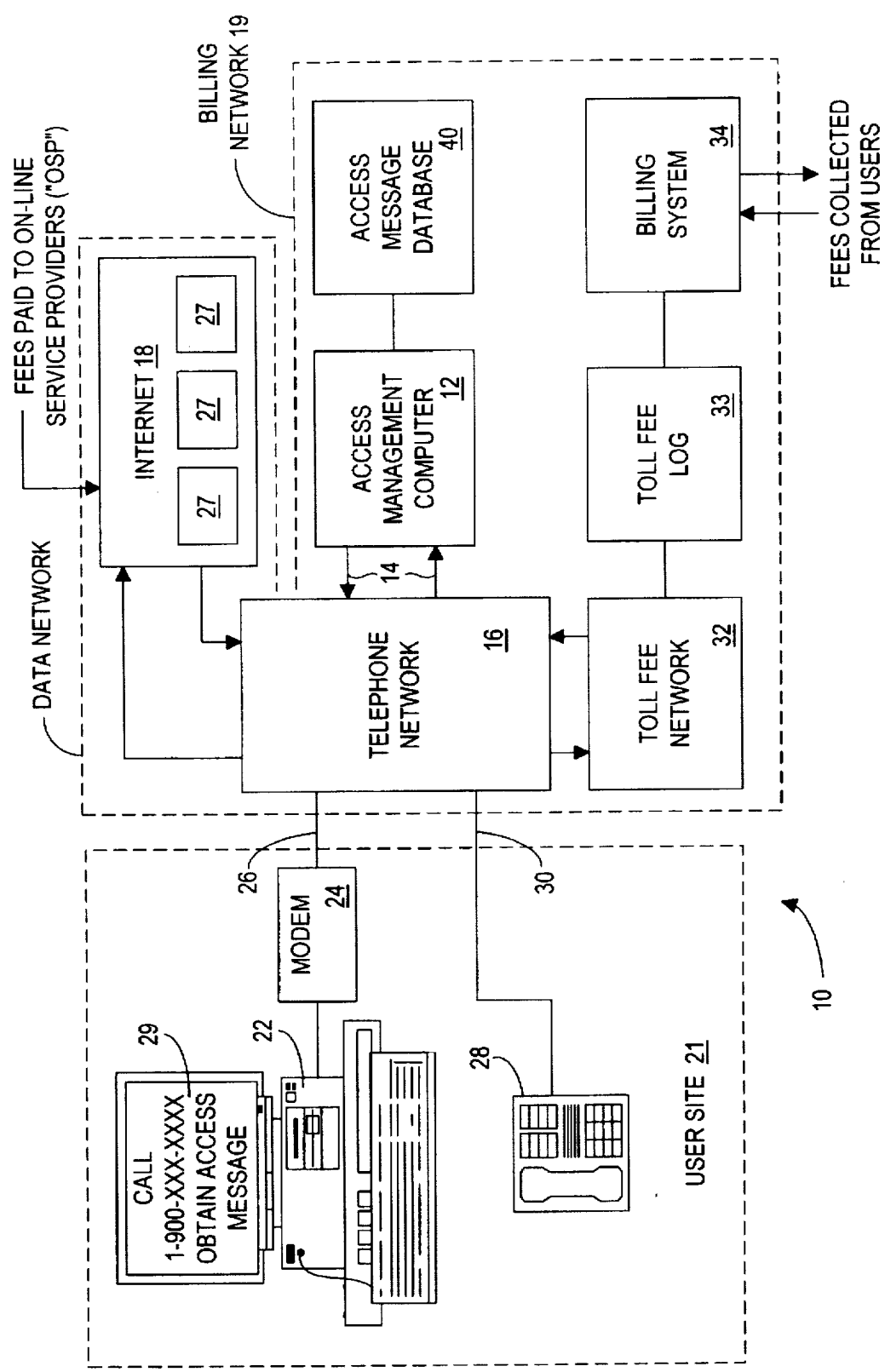
FIG. 1 is a schematic of the billing and collection system in accordance with a first principal embodiment of the present invention.
Figure 2A:
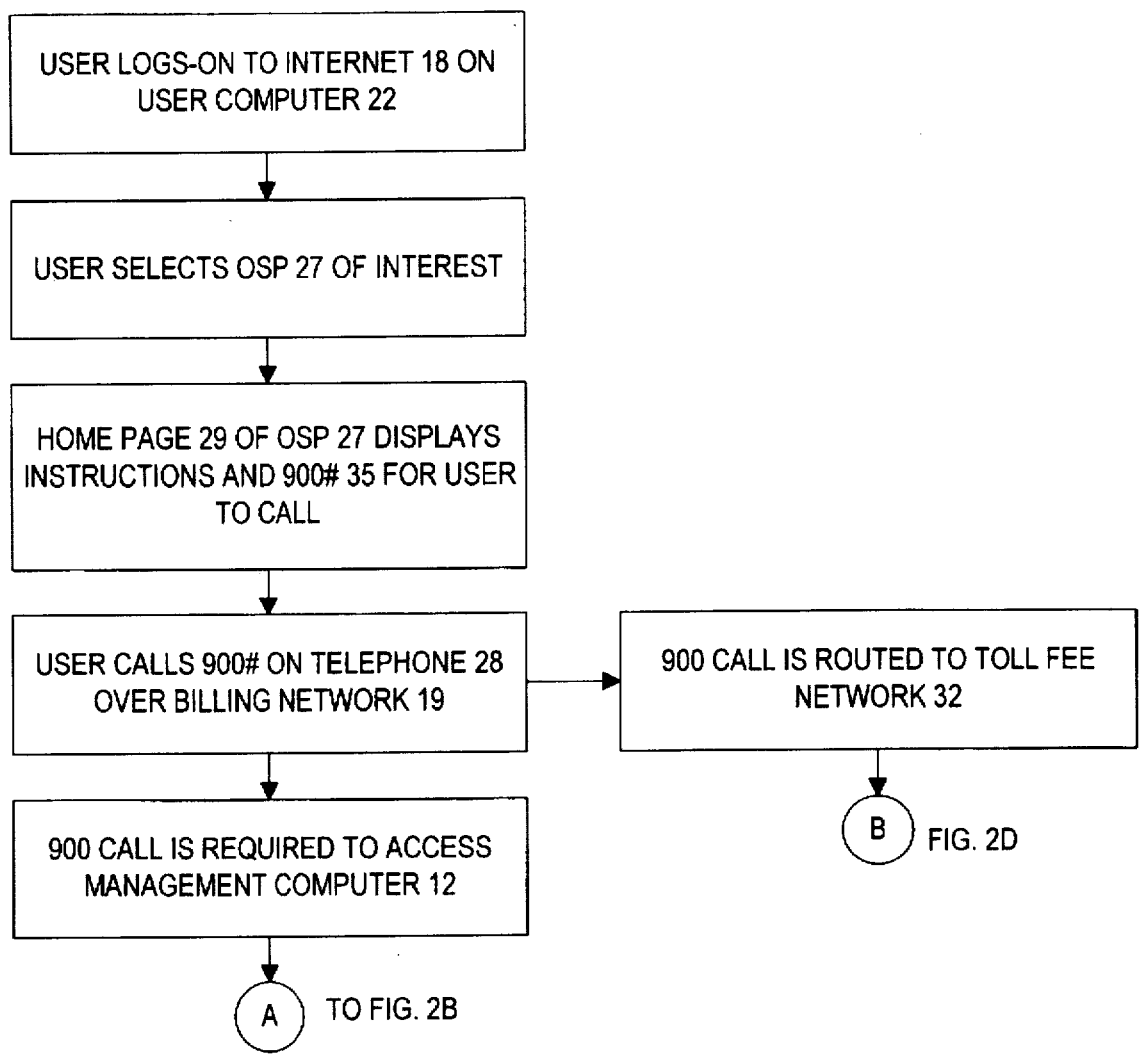
FIG. 2 is a flow chart of the billing and collection process in the first principal embodiment.
Figure 2B:
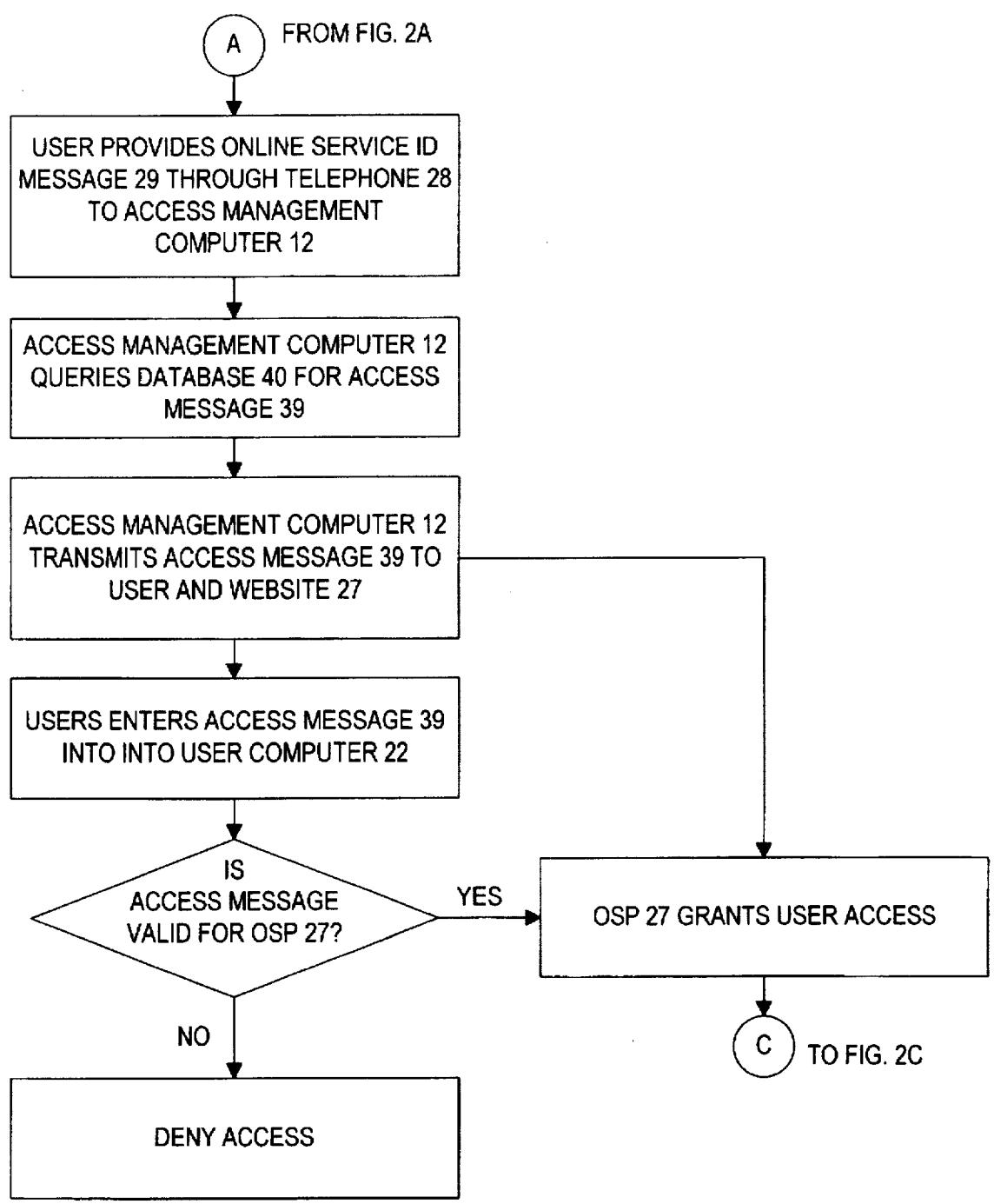
Figure 2C:
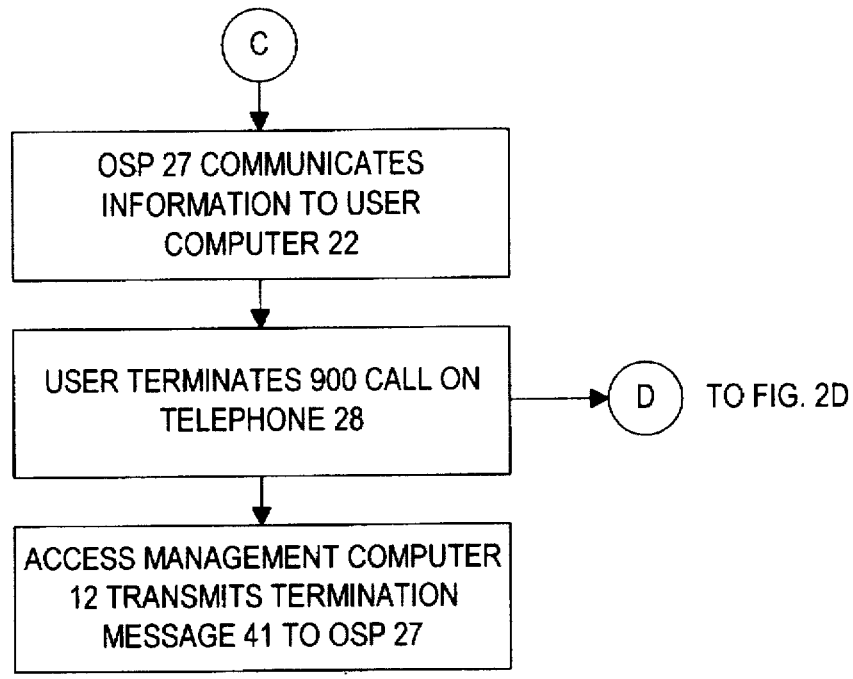
Figure 2D:
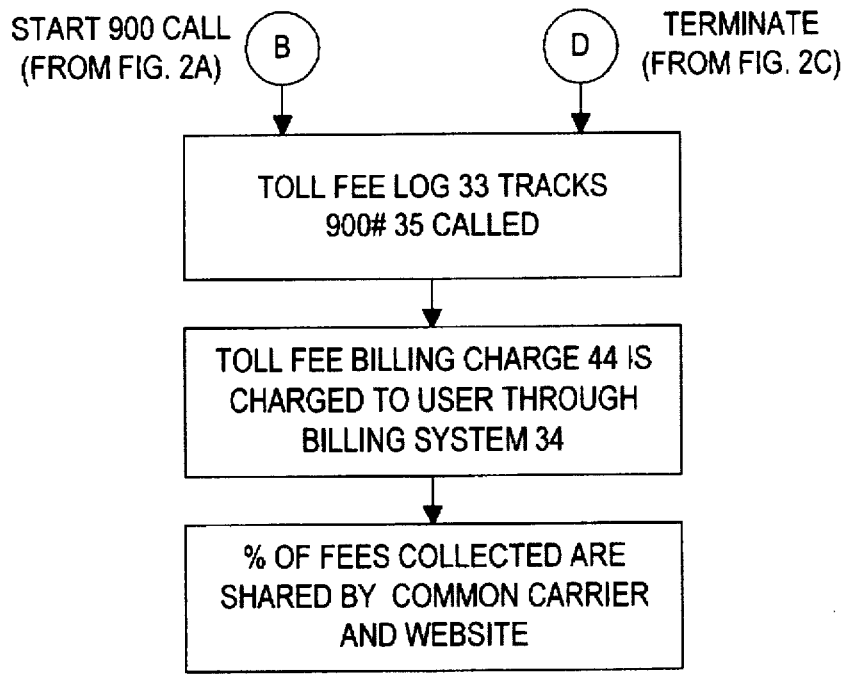

Referring now to FIG. 1, there is depicted a block diagram of a first principal embodiment of the system generally referred to by the reference numeral 10. System 10 includes an access management computer 12, which communicates via a suitable connection 14 with a telephone network 16. The telephone network 16 is connected to a data network 18 (the "Internet"), and includes or is connected to a billing network 19. In this regard, the telephone network 16 may be comprised of a plurality of individual networks, where the Internet 18 and billing network 19 communicate with the user through different telephone companies. The Internet is made up of a plurality of on-line service providers 27. The operation of on-line services is well known and need not be described here in detail. The telephone network 16 is accessed by a user computer 22 through typical hardware such as a modem 24 over a first telephone line 26. Only one user computer 22 is shown for the purpose of illustration, but the Internet 18 is accessible to a large numbers of individual users. Each user requires a telephone 28 which communicates with the telephone network 16 and the billing network 19 over a second telephone line 30 which is separate and apart from the first telephone line 26 and allows calls to be placed to the access management computer 12 to facilitate access to the on-line service providers 27 as described below. The combination of the user computer 22 and telephone 28 may be collectively referred to as the user site 21. Here again, only one telephone 28 is depicted for the sake of clarity. Of course, it is anticipated that the user computer 22 itself could dial the billing network 19 over the second telephone line 30, if the user computer 22 is set up to accommodate parallel lines of communication. Another embodiment where the user computer 22 communicates through a single line of communication is discussed below and illustrated in FIG. 4.

Referring again to FIG. 1, the system 10 utilizes a first channel of communication to communicate information through the Internet 18 and a second channel of communication, the billing network 19, to facilitate billing for the information service provided. The billing network 19 includes a 900#-type shared revenue toll fee or premium charge network which automatically charges a prescribed toll fee or charge to the calling party each time a call is made through the toll fee network. Such toll fee numbers are typically used to provide specific information or services for a given caller, e.g., stock prices, weather, travel information, and the like. For the purposes of the present invention, the use of the term "900#", identified by the reference numeral 35, is not limited to the use of a "900" tollfee network, but may encompass any toll fee or premium charge network that automatically charges a prescribed toll fee which is shared between the on-line service provider 27 (and any service bureau or agent associated therewith) and the telephone company (and any billing agent) each time the toll fee network 32 is accessed. Since some users may wish to have access from a business where 900 calls are blocked, charges may be incurred in connection with, for example, an 800 line as long as the user knows what the charges are for. The prescribed toll fee may be assessed on a per-minute basis, on a combination of fee levels for different amounts of time (i.e., xx¢ per minute or xx¢ per minute after the first x minutes or the like), or a flat fee charge. A toll fee log 33 keeps track of the numbers 35 called. This information is input to a billing system 34, so that the company that manages the billing network can periodically bill the callers who use the 900#.

As shown in the block diagram of FIG. 2, the user first logs-on to the Internet 18 in the customary manner on the user computer 22 over the first telephone line 26. The user selects a on-line service provider 27 containing an information service that he or she wishes to browse. In one embodiment of the invention, the home page 29 of the on-line service provider 27 displays instructions for the user to follow to access the on-line service provider 27. These require that the user call a 900 # 35 for which they will be charged, e.g., xx¢ per minute, some flat fee or combination thereof. The user then calls the 900 # 35 on telephone 28, which call is communicated over the second telephone line 30 and through the billing network of the telephone network 16 to the access management computer 12.

The term "access management computer" is used in a general sense. The access management computer 12 may actually comprise a plurality of computers that are coupled together through an appropriate network, e.g., a local area network (LAN). The access management computer 12 also communicates through the telephone network 16 with the Internet 18 (and thus the on-line service providers 27). When the user calls the 900# 35, the call is routed to the access management computer 12. The user transmits an on-line service identification message 29 through the telephone 28 and the second telephone line 30, which causes the access management computer 12 to provide a unique access message 39 for the service being accessed. The access message 39 is either generated by the access management computer 12 or retrieved from a database 40. The user is prompted on the home page 29 of the on-line service provider 27 to enter the access message 39 into the user computer 22. The access management computer 12 uses the access message 39 to enable access to the on-line service provider, by transmitting the access message 39 to the Internet 18 to make the on-line service provider 27 available for browsing by the specific user who enters the same access message 39 into the user computer 22. In one embodiment, the user receives information from the on-line service provider 27 for as long as desired, and the costs associated therewith are incurred through the toll fee log 33 and billed to the user via the billing system 34 in accordance with conventional practice. The toll fee log 33 computes the fee as a function of the length of time of the 900 telephone call. The user terminates access to the on-line service provider by simply hanging up the telephone 28. The access management computer 12 knows which call has been terminated by checking the corresponding access message 39 for the particular on-line service provider 27 being accessed. Thus, when the call is ended, the access management computer 12 generates a termination message 43 and communicates the same to the on-line service 18, where it is processed to end access to the on-line service provider 27.

In an alternative embodiment, the user need not keep the second telephone line 30 open. After the user places a 900 call as described above, the access management computer 12 similarly generates or retrieves an access message 41 for the on-line service provider 27 to enable the information requested to be downloaded over the Internet and through the first telephone line 26 to the user computer 22, or to allow limited access to the on-line service provider 27 for some predetermined amount of time. The usage charge for the information at the on-line service provider is incurred in connection with the 900 call on some established fee basis (fixed, variable or the like). Here again, the cost for obtaining the information from the on-line service becomes linked to the user's phone bill. In this regard, it is also anticipated that software, in addition to or in lieu of information, could be downloaded to the user computer 22 in the same fashion.

The main advantage provided by these embodiments of the present invention is the separation through parallel communication channels of the flow of money from the flow of information through the computer network, enabling small billing charges for access to the on-line service providers 27 to be collected by a billing network or service bureau which then shares a percentage of the collected revenues with the on-line service providers 27. Another advantage realized by billing for services on the Internet 18 in this fashion, is the elimination of the risk of an unauthorized party obtaining access to a user's credit card number or information regarding the form of payment. The user is simply billed for the 900 call(s) in his or her monthly telephone statement. The information transaction is made easier and less time consuming, and overall billing costs are reduced.

In accordance with the foregoing description, the present invention contemplates a method for billing and collection in a system for enabling shared revenues between an on-line service provider 27 over a data network 18 and a separate billing network 19 by billing a customer for a separate telephone connection over a second telephone line 30 through the billing network 19 where the telephone connection on the second telephone line 30 regulates access to the on-line service provider 27 over the data network 18 on the first telephone line 26 comprising: a data network 18 including at least one user on-line service provider 27 presenting at least one service for on-line access by a user over a first telephone line 26 with a user computer 22 through the data network 18; a billing network 19 accessible through the second telephone line 30; and an access management computer 12 for controlling access to the on-line service provider 27 by at least one of generating, and retrieving from a database 40, an access message 39 in response to a telephone connection over the second telephone line 30, comprising the steps of:

(a) connecting the user computer 22 to the data network 18 over the first telephone line 26 to reach an on-line service provider 27;

(b) calling a 900-type shared revenue telephone number 35 over the second telephone line 30 through the billing network 19 to establish a telephone connection to the access management computer 12;

(c) at least one of generating and retrieving from a database 40, an access message 39 with the access management computer 12 and communicating the access message 39 to at least one of the user and the on-line service provider 27;

(d) enabling access to the on-line service provider 27 for the user on the user computer 22 upon receipt of the access message 39 by said on-line service provider from the access management computer 12;

(e) communicating information (or software) from the on-line service provider 27 to the user computer 22; and (f) generating a billing charge for the telephone connection on the second telephone line 30, billing the user in connection with the toll fee for the 900 call and sharing revenues between the telephone company (or its billing agent) and the on-line service provider 27 (and any service bureau or agent associated therewith).

In one embodiment, the telephone connection on the second telephone line 30 is terminated when the user wishes to leave the on-line service provider 27 to cause the access management computer 12 to terminate access to the on-line service provider 27. Alternatively, the method involves terminating the 900 call immediately after obtaining the access message 39, which access message 39 enables access to the on-line service provider 27 for some predetermined amount of time, either for communicating certain information, or for downloading software to the user computer 22.

Figure 4:
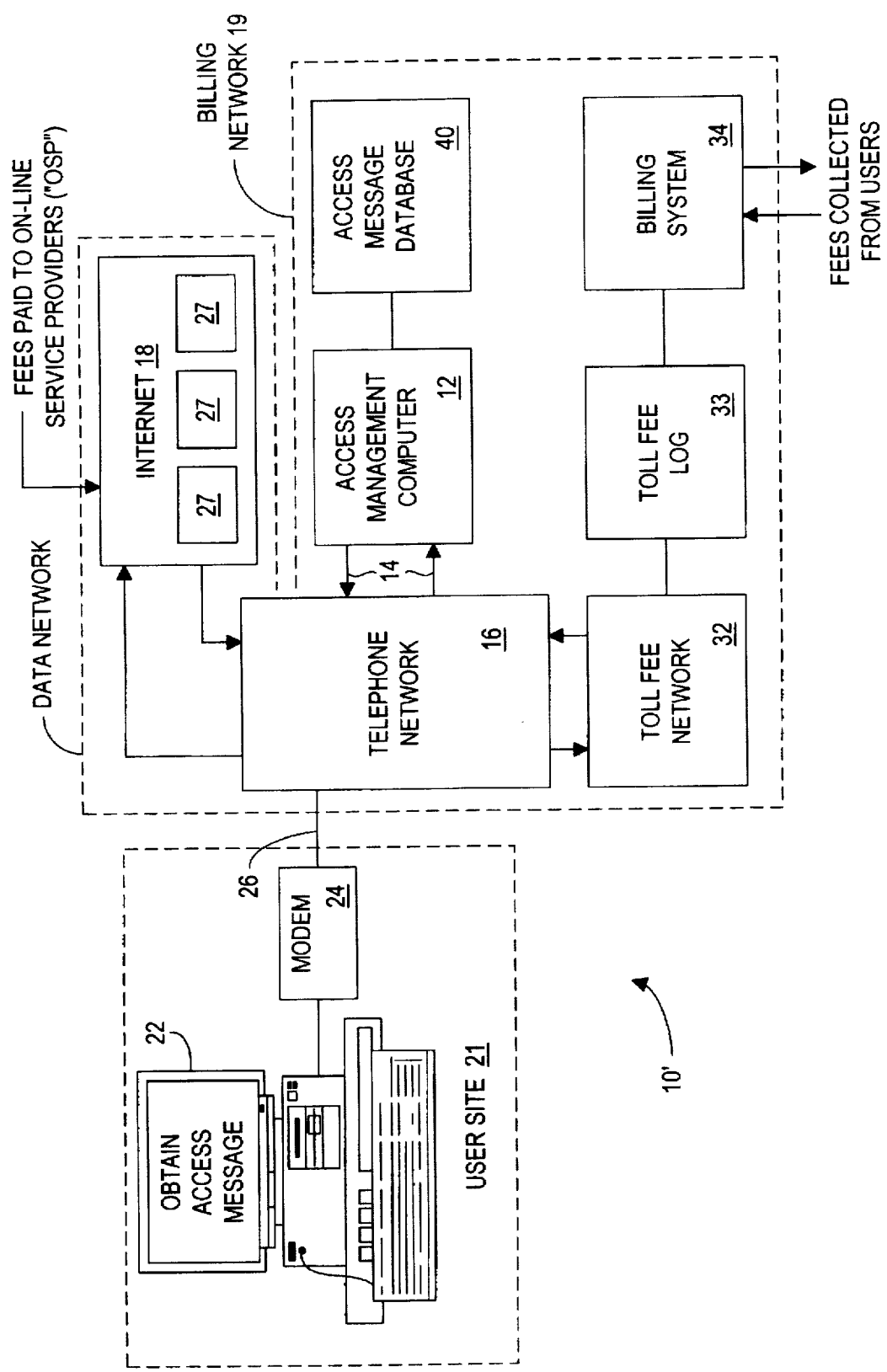
FIG. 4 is a schematic of the billing and collection system in a second principal embodiment of the present invention.

Referring now to FIG. 4, there is depicted a second principal embodiment 10' of the invention where the data network and billing network function essentially as a single entity. The billing network 19 thus serves as a on-line service provider gateway. In this regard, the user computer 22 communicates over a single telephone line 26 with the telephone network and obtains access to the Internet 18 by dialing the 900# 35. When access to a specific on-line service provider is desired, the access management computer generates or retrieves an access message 39 as described above. This access message 39 is communicated to the on-line service provider 27 to enable access to the on-line service provider 27 for the user. The access management computer 12 also sends the access message 39 to the billing network 19 to enable a billing charge to be made in connection with opening the on-line service provider 27 for the user. Here again, the billing network 19 can generate a fixed charge for the particular session, or can generate a per-minute or incremental charge based upon the amount of time that the user spends browsing the on-line service provider. When the user desires to end a session, he or she leaves the on-line service provider 27 by following instructions associated with the on-line service provider 27, causing the on-line service provider 27 to either send a termination message 41 to the access management computer 12 and the billing network 19, or if the access management computer 12 continuously monitors access to that particular on-line service provider 27 for that particular access message 39, the access management computer 12 will signal the billing network 19 that billing for that session is to be completed. The user is billed for access to the on-line service provider as described with respect to the first principal embodiment. However, in this embodiment, the user may be billed for all time on the 900 line, plus the costs of access to any of the on-line service providers 27. Since different on-line service providers may charge different amounts for access, such charges could be itemized on the user's bill for calls made to the billing network. In an alternative single communication channel embodiment, the access message 39 may be authenticatable whereby it is generated by the user computer using known encryption protocols and is communicated to the on-line service provider 27 through the data network 18 whereupon it is read and authenticated (decrypted) by the on-line service provider 27 for access. In this regard, the authenticatable access message may contain user specified limitations as to desired access time and maximum cost to be incurred for any session.

Figure 5:
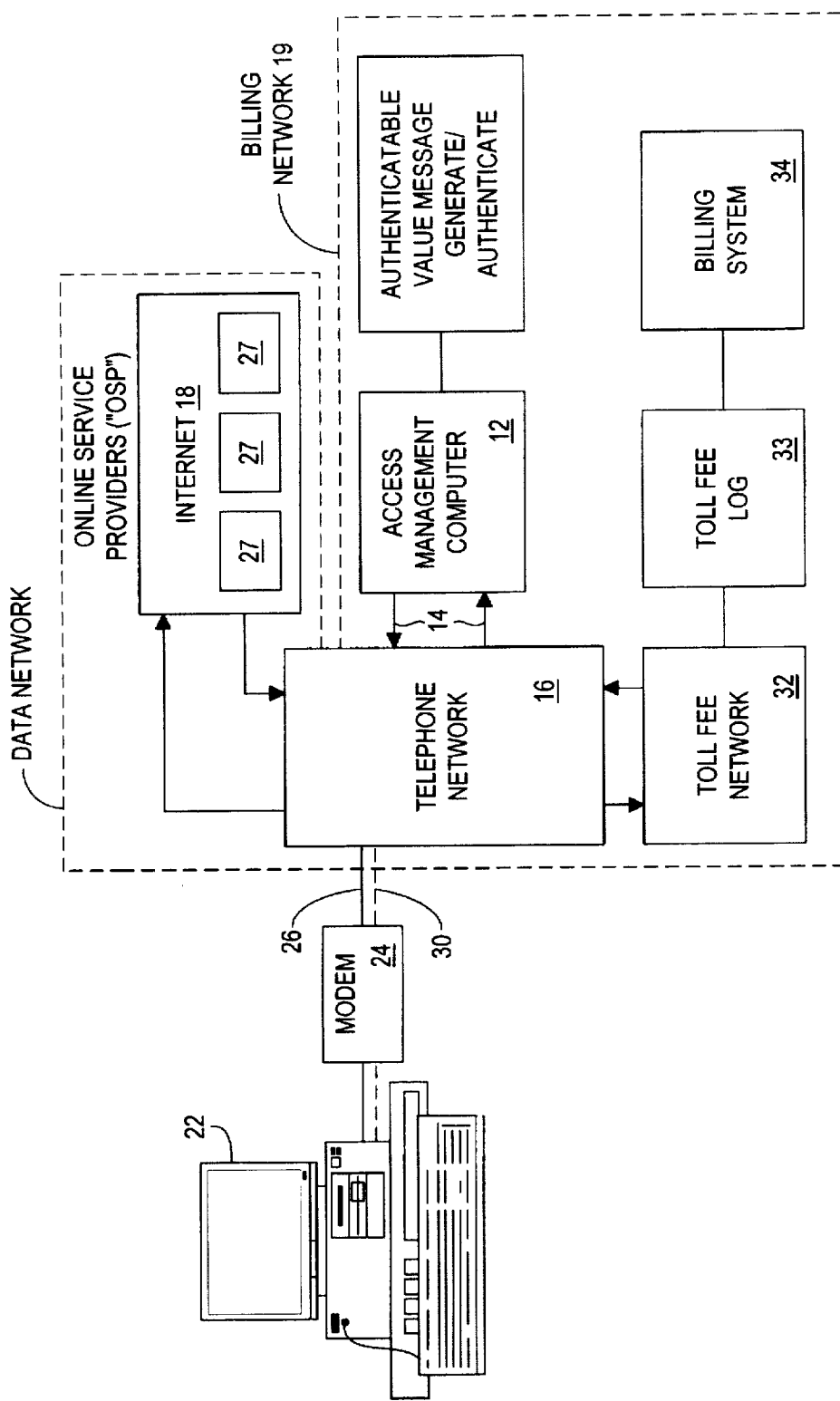
FIG. 5 is a schematic of the billing and collection system in a third principal embodiment of the present invention.
Figure 6:
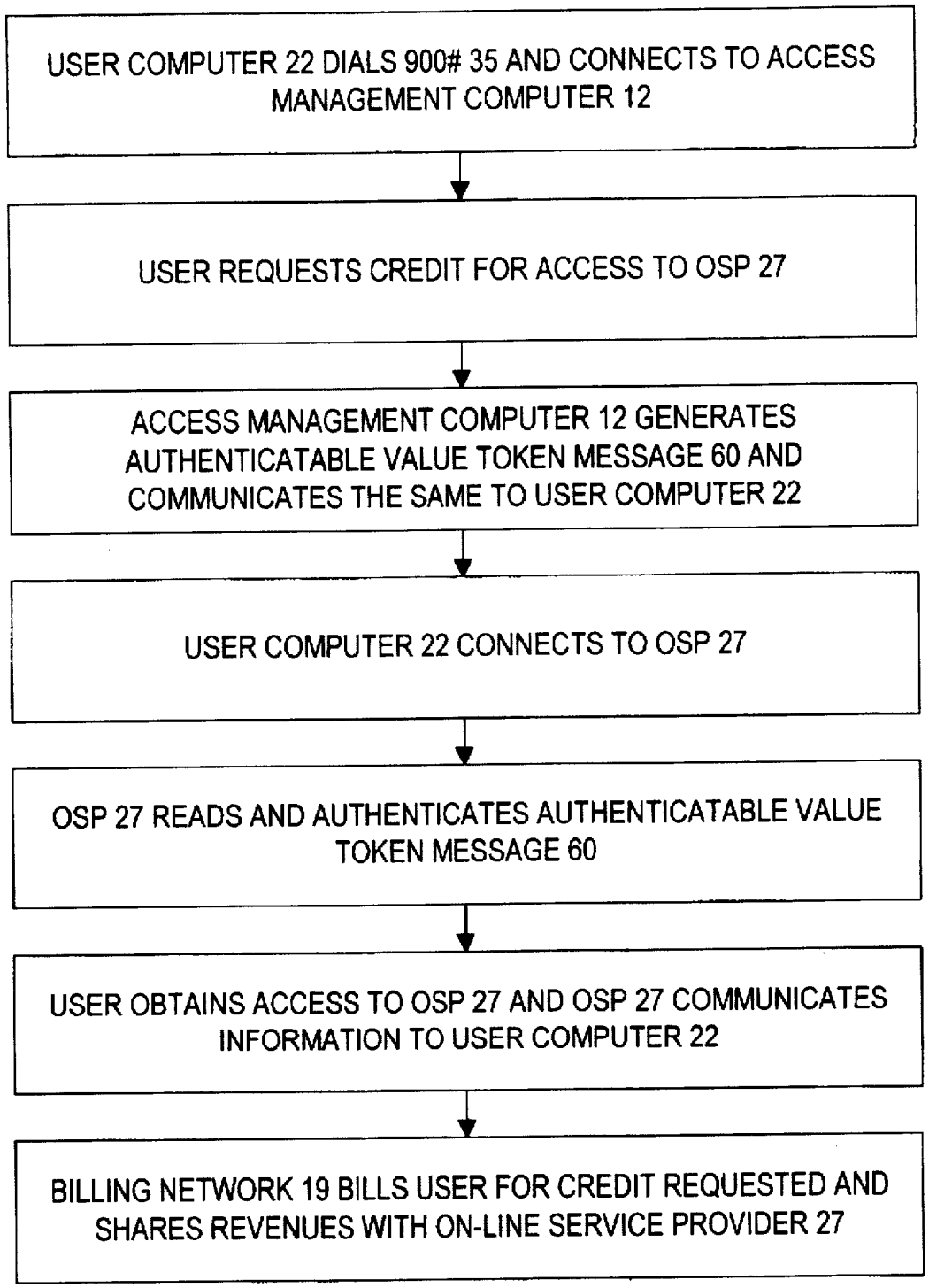
FIG. 6 is a flow chart of the billing and collection process in the third principal embodiment of the present invention.

Referring now to FIGS. 5 and 6, there is depicted a third principal embodiment of the invention in which credit is obtained from the billing network and charged to the user through the phone company as described above with respect to the other embodiments. This credit is downloaded to the user computer 22 and communicated to the on-line service provider 27 over the data network 18. The system operates in the following manner. First, the user computer 22 dials the 900# 35 and connects to the access management computer 12. This may be done either on a single telephone line 26 which serves to connect to both the billing network 19 and the data network 18, or through a second telephone line 30 which independently to communicates the user computer 22 with the billing network for the sole purpose of obtaining credit. The user is prompted through appropriate software to enter the amount of credit requested for on-line service provider access. The user enters the amount into the user computer 22, and the access management computer 12 generates an authenticatable value token message 60 which is based upon the amount of credit requested, an identification message 62 of the particular on-line service requested, and possibly the 900# or the user's own telephone number or some other personal identification code. The value token message is transmitted to the user computer 22 and stored in memory. The user then connects to the on-line service provider 27 which has its own computer 52 which reads and authenticates the value token message 60. The authentication may take the form of encryption and decryption. The user is then provided access to the on-line service provider to the extent of available credit embodied in the value token message 60. The value token message 60 may be obtained in fractional amounts if desired. In this regard, the value token message 60 may represent a series of fractional amounts of credit (e.g., pennies, dimes or quarters) which are used by the on-line service provider to gain access for corresponding limited amounts of time. Thus, the on-line service provider 27 would intermittently read and authenticate the value token message 60 and allow the user continued access to the extent of any remaining credit. When all credit is exhausted, access for the user is terminated until the user goes back to the billing network 19 and repeats the procedure. The user is billed through the billing system 34 and revenues are shared with the on-line service provider 27 as described above with respect to the other embodiments.

Figure 8:
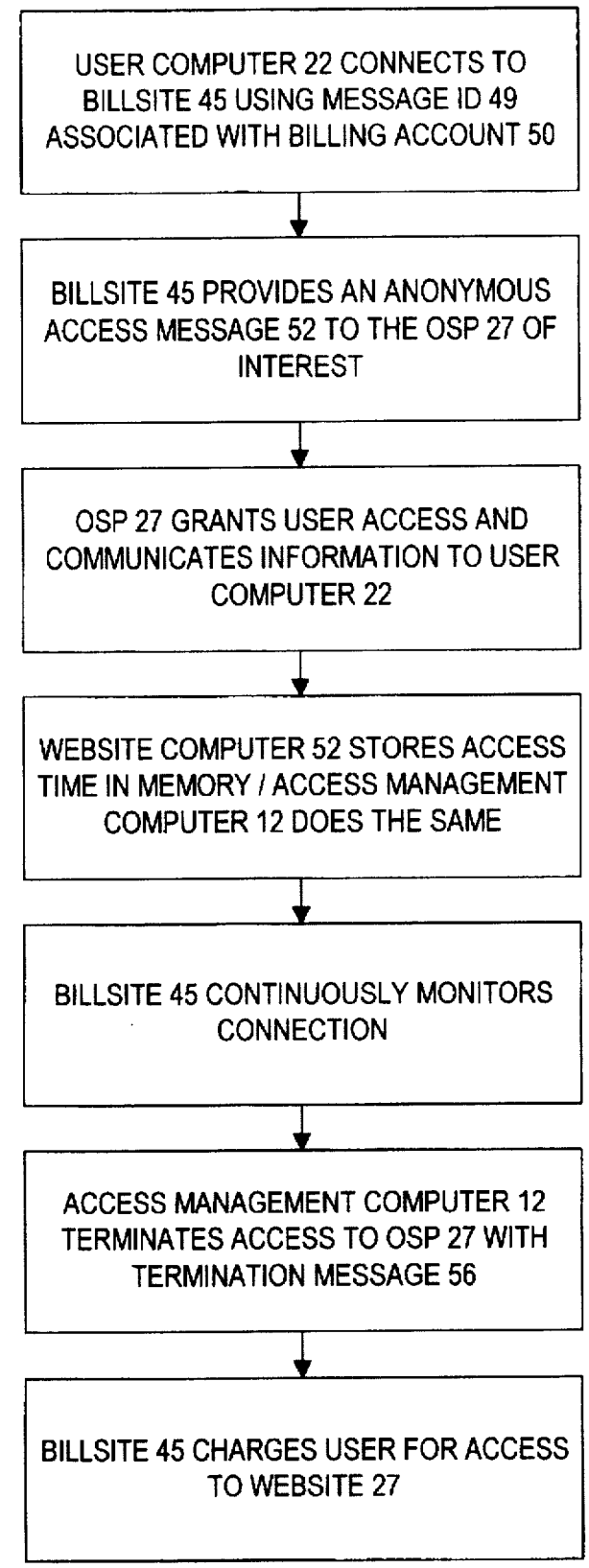
FIG. 8 is a flow chart of the billing and collection process in the fourth principal embodiment of the invention.

Referring now to FIGS. 7 and 8, in a fourth principal embodiment of the invention, the user computer 22 communicates through the telephone network 16 with an access billing site ("billsite") 45 which regulates all billing for and access to the information service on-line service providers 27. The billing site 45 has an access management computer 12 associated therewith which facilitates access to the on-line service providers 27 and communicates with a billing system 34. The billing system 34 bills access charges to the user's on-line service account 50. When a user desires to obtain access to an on-line service provider 27, he or she is prompted by the billsite 45 to enter a message ID 49 associated with the user's on-line billing account 50. The billsite then provides an anonymous access message 52 to the particular on-line service provider 27 to which access is requested. The on-line service provider 27 may have its own computer 52 which records the amount of time access is made available for any given session. Similarly, the access management computer 12 at the billsite 45 may do the same to serve as a redundant audit trail. The access management computer associated with the billsite 45 continuously monitors the connection. When the user desires to terminate access to the on-line service provider 27, the access management computer 12 sends a termination message 56 to the on-line service provider 27 to terminate user access. The process may be repeated if the user desires access to another on-line service provider 27. The billsite 45 accumulates bills for all on-line service provider sessions, and then bills the user through the billing system 34 in a conventional manner. Since the charges for various on-line service providers 27 may vary, the billsite 45 can bill the user a single aggregate charge for all on-line service providers accessed during any given period of time, even if the individual charges differ among all of the on-line service providers.

The present invention has been shown and described in what are considered to be the most practical and preferred embodiments. It is anticipated, however, that departures can be made therefrom and that obvious modifications will occur to persons skilled in the art.

What we claim is:

1. A method for utilizing an access management computer to control a user's access to digital data provided by an on-line server over a data network wherein a billing system separate from said on-line server charges said user for access to said digital data, comprising the steps of:

said access management computer receiving, from said billing system, a message indicating that said user has requested access to digital data;

said access management computer interfacing with said on-line server;

said access management computer sending an access message to said on-line server to signal said on-line server to provide said digital data to said user over said data network; and said access management computer providing, to said billing system, said access message corresponding to said user's request for access.

2. The method of claim 1, wherein said access message is provided to said user for transmission to said on-line server over a first communications channel separate from a second communications channel over which said user is connected to said billing system.

3. The method of claim 1, wherein said access message contains billing information for use by said billing system.

4. The method of claim 3, wherein said billing information is associated with a quantity of information which said user has requested from said on-line server.

5. The method of claim 3, wherein said billing information is associated with a period of time during which said user is connected to said on-line server.

6. A method for utilizing an access management computer to control a user's access to digital data provided by an on-line server over a data network wherein a billing system separate from said on-line server charges said user for access to said digital data, comprising the steps of:

said access management computer receiving, from said billing system, a message indicating that said user has requested access to said digital data;

said access management computer interfacing with said on-line server;

said access management computer generating an access message; and said access management computer sending said access message to said on-line server to signal said on-line server to provide said digital data to said user over said data network.

7. A method for utilizing an access management computer to control a user's access to digital data provided by an on-line server over a data network wherein a billing system separate from said on-line server charges said user for access to said digital data, comprising the steps of:

said access management computer receiving, from said billing system, a message indicating that said user has requested access to said digital data;

said access management computer interfacing with said on-line server;

said access management computer reading an access message from a database; and said access management computer sending said access message to said on-line server to signal said on-line server to provide said digital data to said user over said data network.

8. A method for utilizing an access management computer to control a user's access to digital data provided by an on-line server over a data network wherein a billing system separate from said on-line server charges said user for access to said digital data, comprising the steps of:

said access management computer receiving, from said billing system, a message indicating that said user has requested access to said digital data;

said access management computer interfacing with said on-line server;

said access management computer receiving an access message from said user via said billing system; and said access management computer sending said access message to said on-line server to signal said on-line server to provide said digital data to said user over said data network.

9. The method of claim 8, further comprising the step of said access management computer decrypting said received access message prior to the step of said access management computer sending said access message to said on-line server.

10. The method of claim 8, wherein said access message includes a user-specified access limitation.

11. A method for utilizing an access management computer to control a user's access to digital data provided by an on-line server over a data network wherein a billing system separate from said on-line server charges said user for access to said digital data, comprising the steps of:

said access management computer receiving, from said billing system, a message indicating that said user has requested access to said digital data;

said access management computer interfacing with said on-line server;

said access management computer sending an access message to said on-line server to signal said on-line server to provide said digital data to said user over said data network; and said access management computer disconnecting from said on-line server upon occurrence of a predetermined event.

12. The method of claim 11, wherein said predetermined event includes passage of a specified time interval.

13. The method of claim 11, wherein said predetermined event includes accrual of a predetermined billing amount.

14. The method of claim 11, wherein said predetermined event includes receiving a user disconnect signal from said billing system.

15. The method of claim 11, wherein said predetermined event includes obtaining a session completion indication from said on-line server.

16. The method of claim 15, wherein said obtaining said session completion indication comprises monitoring said on-line server.

17. The method of claim 11, further comprising the step of providing an auxiliary billing signal to said billing system based on said predetermined event.

18. The method of claim 17, wherein said auxiliary billing signal is associated with a quantity of information which said user has requested from said on-line server.

19. The method of claim 18, wherein said auxiliary billing signal is associated with a period of time during which said user is connected to said on-line server.

* * * * *